Figure 1:
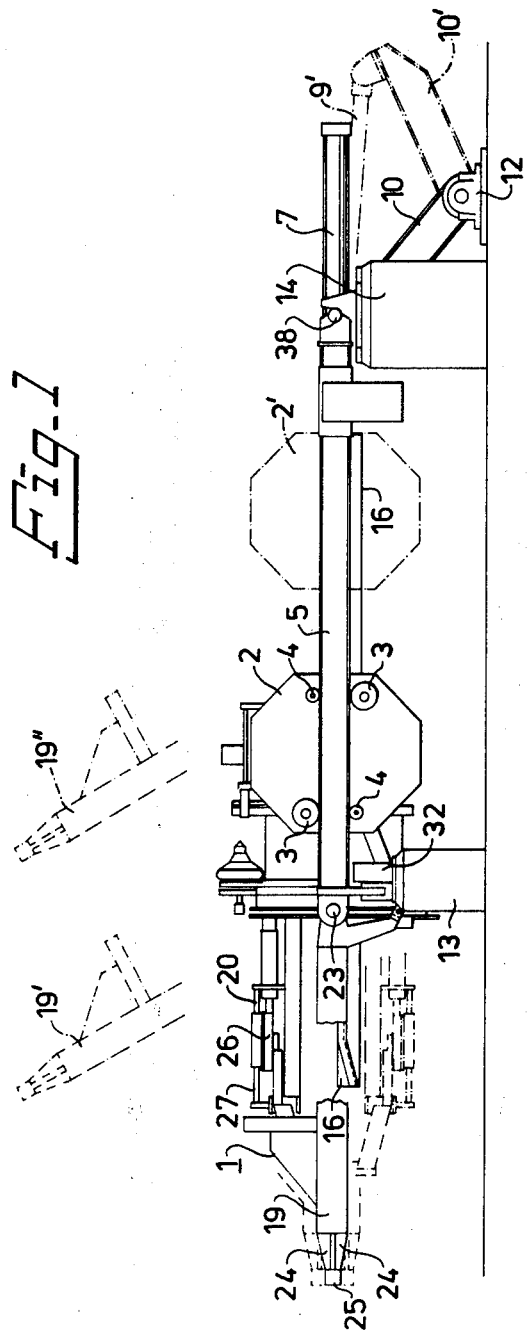

United States Patent [19]

Sebardt

[11] 4,019,361
[45] Apr. 26, 1977

[54] MANIPULATOR FOR ROLLING MILL

[75] Inventor: Carl Sebardt, Stockholm, Sweden

[73] Assignee: Siftelsen for Metallurgisk Forskning, Lulea, Sweden

[22] Filed: Feb. 4, 1976

[21] Appl. No.: 655,067

[30] Foreign Application Priority Data

Feb. 13, 1975 Sweden .............................. 7501630

[52] U.S. Cl. ................................ 72/252; 214/1 BB
[51] Int. Cl.² ................. B21B 39/06; B21B 39/30; B21B 39/00
[58] Field of Search ..................... 72/252, 250, 366; 214/1 BB, 1 BD, 147 G, 147 T

[56] References Cited

UNITED STATES PATENTS

| 723,834 | 3/1903 | Cooper | 72/252 |
| 2,109,904 | 3/1938 | Iversen | 72/366 |
| 3,156,138 | 11/1964 | Johnson | 72/252 |
| 3,750,806 | 8/1973 | Bartleet | 214/1 BB |

Primary Examiner—Milton S. Mehr

[57] ABSTRACT

Manipulator for a rolling mill and particularly for a rolling mill for ingots or billets of steel. The manipulator comprises a pusher for pressing the ingot or billet through the roll-nip of the rolls at the beginning of rolling, and grab means for manipulating the ingot or billet during rolling when the pusher is raised up and the grab means can reach the ingot or billet.

4 Claims, 4 Drawing Figures

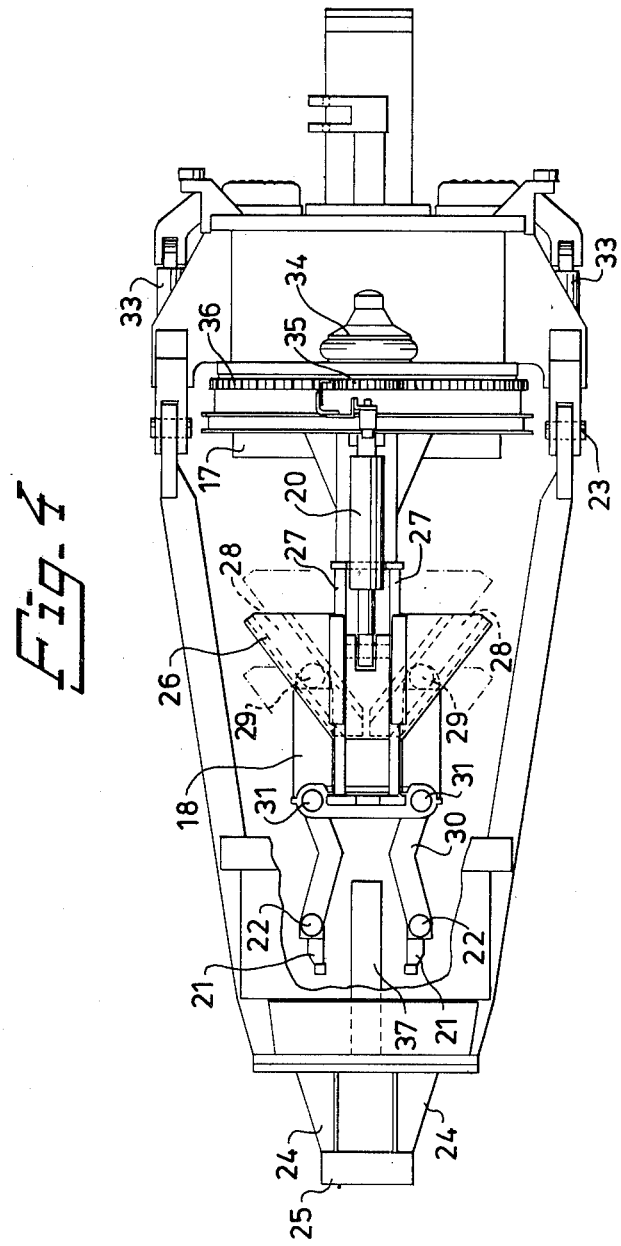

MANIPULATOR FOR ROLLING MILL

The present invention relates to a manipulator for a rolling mill, particularly a hot rolling mill for ingots or billets, comprising a pusher for pressing the rolled metal through the roll-nip in the pertaining mill stand in the rolling mill, and a manipulator head having grab means for manipulating the rolled metal.

As is known when rolling in a hot rolling mill, an ingot or a billet is fed in between the pair of rolls by the driving roll itself without any extra pushing of the ingot or the billet. For making possible this self-feeding the pair of rolls must be adjusted to not too a big reduction, as there is otherwise a risk that the ingot or billet does not enter in between the rolls, but is rejected back.

In the Swedish patent specification 166,579 is described a kind of a pusher comprising a hydraulic cylinder having a plunger, which assists when feeding a billet in between the rolls in a planetary rolling mill. However, this kind of pusher is inapplicable in a modern rolling mill for ingots or billets from a practical point of view.

The object of the present invention is to attain a manipulator comprising a pusher by means of which it will be possible in a pliable manner to effect a substantially larger reduction in one and the same pass in a hot rolling mill for ingots or billets than has been possible hitherto in conventional rolling mills of this kind.

The manipultor according to the invention is characterized in that the pusher is adjustable between a lowered working position for pressing the rolled metal through the roll-nip of the rolls and an upper rest position, in which the grab means can reach the rolled metal during the rolling operation for manipulating it.

A special embodiment of the manipulator according to the invention is characterized by a ring-shaped manipulator head, which is provided with a rotary part having grab means for holding the rolled metal, wherein the pusher is hinged at the manipulator and can be lowered down in front of the rotary part for pressing or pushing the rolled metal in between the rolls and can be raised up during the rolling operation so that the grab means can reach the rolled metal for manipulating it.

By the manipulator head being ring-shaped, it is possible for the rolled metal to pass backwards and forwards through the manipulator when the grab means are opened and rolling takes place.

The invention will be described in detail in the following specification with reference to the accompaning drawings, on which an embodiment of the manipulator according to the invention is diagrammatically illustrated as an example.

Figure 2:
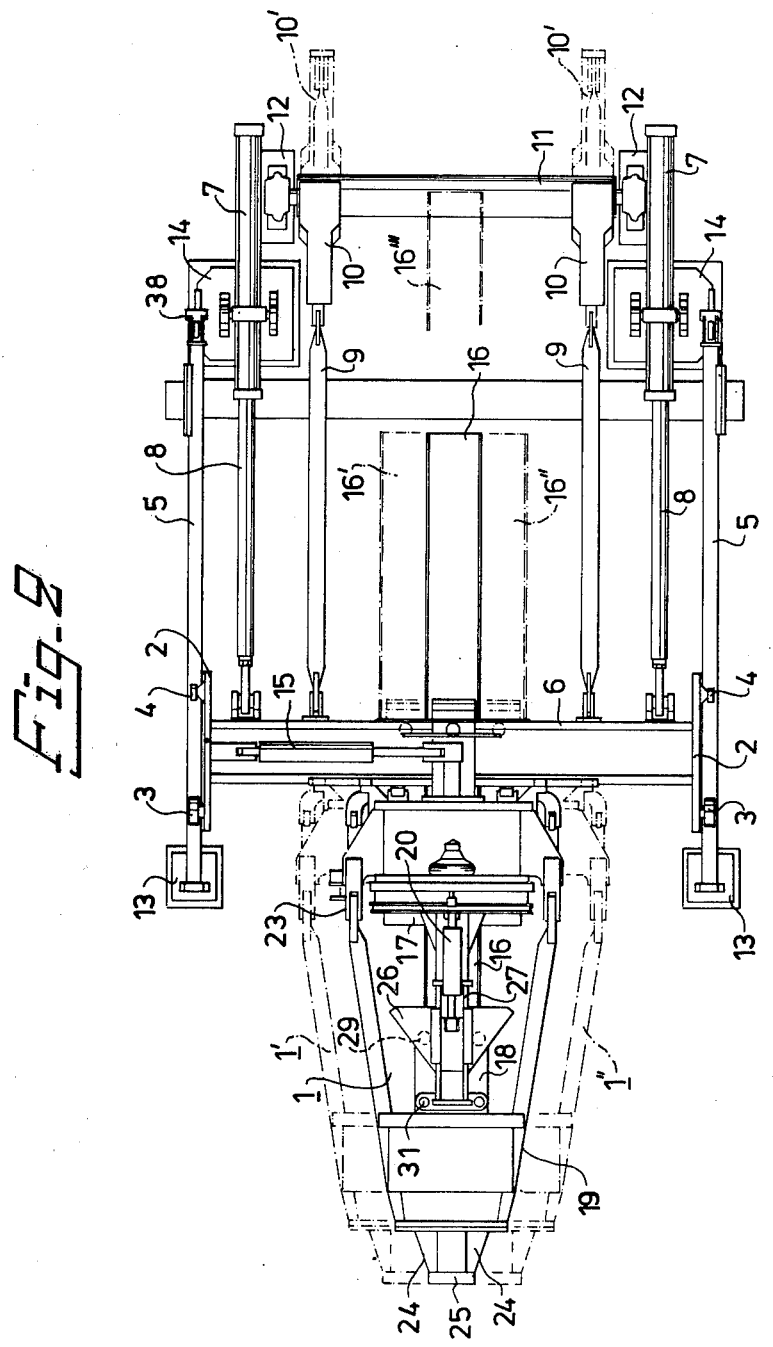
Figure 3:
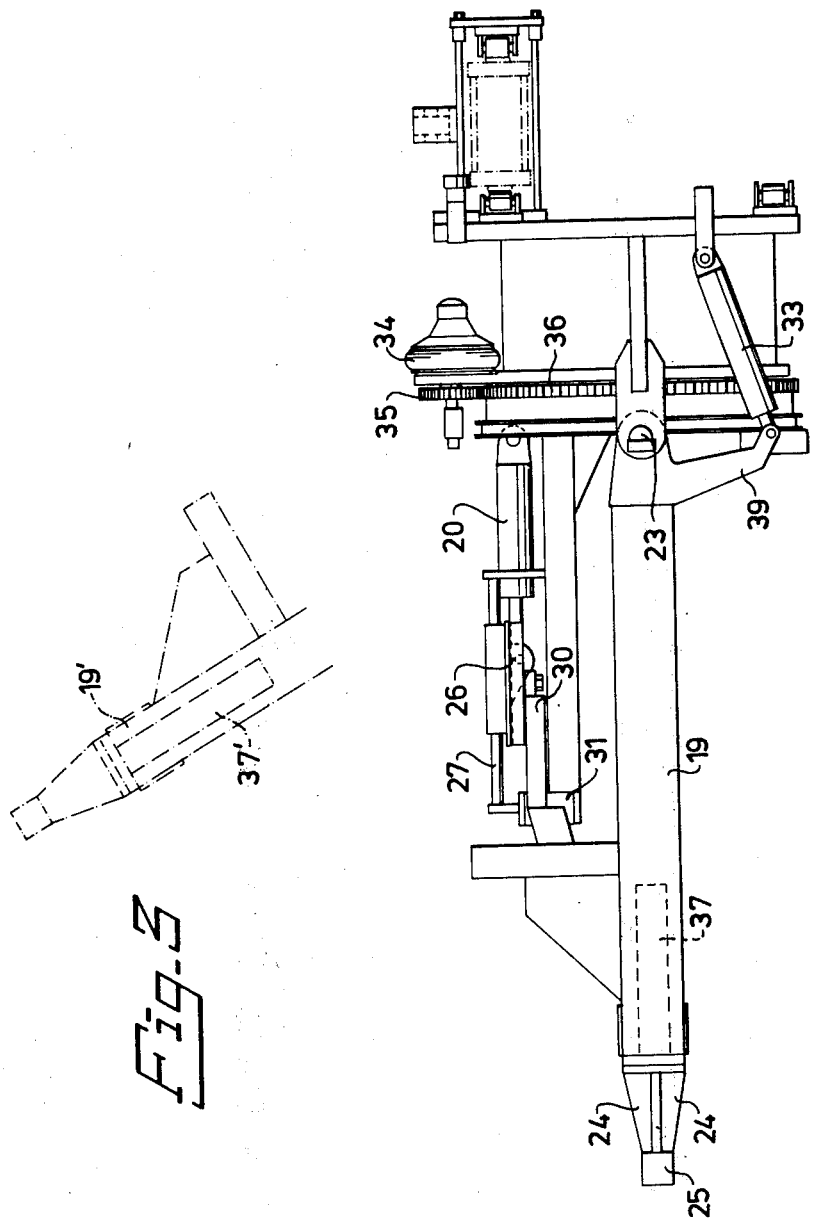

FIG. 1 is a side elevation and
FIG. 2 is a plan view of the manipulator.
FIGS. 3 and 4 are a side elevation and a plan view respectively of the manipulator head in enlarged scale compared with FIGS. 1 and 2.

The manipulator according to FIGS. 1 and 2 comprises a ring-shaped or annular manipulator head 1 and two travelling trolleys 2, which travel each on its own rail 5. Each trolley 2 has two pairs of wheels 3, 4, comprising a larger wheel 3 and a smaller wheel 4. One of the wheels in each pair runs on the top of the rail 5, while the other wheel in each pair runs underneath of the rail 5. The trolleys 2 are guided on the inside of rails 5 and are rigidly interconnected by means of a bay 6.

The transfer of the trolleys 2 along the rails 5 is done by means of two hydraulic longitudinal displacement cylinders 7, the piston rods 8 of which are connected to the bay 6. The rear position of trolleys 2 is indicated in FIG. 1 through the chain-dotted line 2'.

Two guiding rods 9, which each are connected swivelling between the bay 6 and a guiding bar 10, are arranged to guide the travelling of the trolleys 2 along the rails 5. The rear positions of rods 9 and bars 10 are indicated in FIGS. 1 and 2 through the chain-dotted lines 9' and 10' respectively. Bars 10 are mounted at their lower ends swivelling adjacent to each end of a parallel or guiding shaft 11, which is supported by two supports 12 mounted on a ground, e.g. a floor. The remaining part of the manipulator, including the rails 5, rests on the same ground by means of four foundations 13, 14, consisting e.g. of concrete.

The manipulator head 1, which is illustrated in greater detail and in an enlarged scale in FIGS. 3 and 4, is supported by and is displaceable laterally along the bay 6 for centering the head in relation to the roll-nip of the rolls, the two outer positions of the head being illustrated through the chain-dotted lines 1' and 1''. Said lateral displacement is done by means of a lateral displacement cylinder 15. The manipulator comprises a chute 16 for guiding the rolled metal backwards on a roller bed via an oblique plane. The chute is displaceable laterally and longitudinally together with the manipulator head 1 and the two outer positions in the lateral direction are indicated through the chain-dotted lines 16' and 16'' respectively in FIG. 2, while the rear position is indicated by the chain-dotted line 16'''. The three main parts of the manipulator head 1 are a rotary head 17, a grab means 18 rotatable with or by the head 17, and a pusher 19. The grab means 18 is operated by means of a cylinder 20, which opens and closes the gap between the clamping plates 21 of the grab means, said plates swivelling around turning points 22.

As is illustrated on the drawing through the chain-dotted lines 19' and 19'', pusher 19 can be pivoted upwards around turning point 23. The position of the pusher in the rear position 2 ' of the trolleys 2 is indicated by 19''. The pusher 19 comprises in the frontpart of it plate springs 24, to which is welded a pusher plate 25, which is intended to press against the end of the rolled metal, which e.g. can be an ingot.

The grab means 18 comprises a triangle 26, which is displaceable forwards and backwards by means of the cylinder 20. Triangle 26 is mounted on round bars 27 and has channels 28, in which guide rollers 29 controlling the grab mean arms 30 are sliding, so that said arms are rotated around their turning points 31.

The front part of the manipulator with the manipulator head 1 can be raised and lowered by means of two hydraulic cylinders 32, which are mounted on the foundations 13, and the manipulator is then turned around the shaft 38 in its rear part. The object of this vertical displacement is to make possible the centering of the manipulator head in elevation in relation to the roll-nips of the rolls in addition to the previously mentioned possibility of centering the head laterally.

The control of the pusher 19 between its horizontal position and its raised position is done by means of two hydraulic cylinders 33, the piston rods of the cylinders each being connected to an arm 39 in the rear part of the pusher. Pusher 19 comprises moreover in its fromt part a bar 37, around which the clamping plates 21 of the grab means grasp in order to fix the pusher in position when it is lowered down and is to press upon rolled metal, such as an ingot.

The turning of the head 17 of the manipulator head is done by means of a hydrauic motor 34, which drives a gear 35, which meshes a gear ring 36, that is firmly connected to the head 17 and that is a part of a ball bearing ring, the other part of which is firmly connected to the non-rotary part of manipulator head 1.

In operation a manipulator is positioned in fixed relation on one side of a pair of cooperable rolls of a rolling mill. If desired, and as is preferred, a second manipulator is positioned on the other side of such rolls. The manipulator pusher 19 is aligned with the roll-nip or roll groove of the rolls. On the other side of the roll said second manipulator has its pusher 19 raises so that its grab means 18 can reach (receive) the billet being rolled, and manipulate it, i.e. turn it and move it to the next (smaller) roll groove after it has completed the first pass. When the billet is aligned with the roll-nip and the rolls are about to seize the billet, the grab means, which can be seen to resemble a form of tongs, are disengaged from the billet and the pusher is lowered from its rest position into its working position to effect pushing or pressing of the billet in a second pass through the roll-nip from that other side of the rolling mill. The pusher of the manipulator on the first side of the mill is now raised into its rest position so that the grab means of the first manipulator are ready to receive the billet after said second pass on the first side of the mill, and turn it and move it to the next (third) pass. The grab means or tongs are not movable through the roll-nip as they would then of course be damaged.

As will be understood, it is not essential to operate with a second manipulator on the other side of the rolls since the ingot or billet may be handled in a conventional manner manually by an operator with tongs.

In the foregoing has been described a special embodiment of the invention, but the invention is not limited to said special embodiment, but comprises all embodiments within the frame of the patent claims.

I claim:
1. Manipulator for feeding ingots or billets to the roll-nip of the rolls of a rolling mill, comprising support means adapted to be maintained in fixed relation on one side of a pair of cooperable rolls, a manipulator head carried by said support means for movement longitudinally and laterally thereof, said manipulator head including a rotatable head and means for rotating same, grab means adapted to releasably grasp one end of an ingot or billet rotatable with said rotatable head, and a pusher means carried pivotably for pivotal movement between an upper rest position above said grab means and in which upper rest position the grab means is movable to a forward position in which it can grasp an end of the ingot or billet and a lower working position in front of said rotatable head and in front of said grab means so as to be engageable with said one end of the ingot or billet to feed same to the roll-nip of the rolls.

2. Manipulator as claimed in claim 1, wherein the manipulator head is pivotable at the rear end thereof so that the front part thereof can selectively be raised and lowered.

3. Manipulator as claimed in claim 1, wherein said pusher means includes at the front portion thereof a rearwardly extending bar graspable by said grab means in order to fix the pusher means in its working position.

4. Manipulator as claimed in claim 1, wherein said pusher means is a peripherally extending member which in its working position peripherally encloses said rotatable head of the manipulator head and said grab means.

* * * * *